US011461826B1

(12) United States Patent
Herdling et al.

(10) Patent No.: US 11,461,826 B1
(45) Date of Patent: Oct. 4, 2022

(54) REMOTE BEVERAGE PURCHASING SYSTEM

(71) Applicant: Hadom Enterprises, LLC, Naples, FL (US)

(72) Inventors: Glenn Herdling, River Vale, NJ (US); Brian Dusman, Union, NJ (US); Neha Mohta, Denver, CO (US); Ravi Bhalotia, Denver, CO (US)

(*) Notice: Subject to any disclaimer, the term of this patent is extended or adjusted under 35 U.S.C. 154(b) by 0 days.

(21) Appl. No.: 17/078,464

(22) Filed: Oct. 23, 2020

Related U.S. Application Data

(60) Provisional application No. 62/925,932, filed on Oct. 25, 2019.

(51) Int. Cl.
| | |
|---|---|
| *G06Q 30/06* | (2012.01) |
| *G06Q 20/20* | (2012.01) |
| *G06Q 20/32* | (2012.01) |
| *G06Q 20/04* | (2012.01) |
| *H04W 4/029* | (2018.01) |

(Continued)

(52) U.S. Cl.
CPC ....... *G06Q 30/0633* (2013.01); *G06Q 20/047* (2020.05); *G06Q 20/085* (2013.01); *G06Q 20/14* (2013.01); *G06Q 20/202* (2013.01); *G06Q 20/209* (2013.01); *G06Q 20/326* (2020.05); *G06Q 20/3224* (2013.01);
(Continued)

(58) Field of Classification Search
CPC ............ G06Q 30/0633; G06Q 20/326; G06Q 30/0641; G06Q 20/209; G06Q 50/12; G06Q 20/047; G06Q 20/085; G06Q 20/202; G06Q 20/14; G06Q 20/3224; G06Q 20/3274; H04W 4/029
See application file for complete search history.

(56) References Cited

U.S. PATENT DOCUMENTS

| | | | | |
|---|---|---|---|---|
| 5,912,743 | A * | 6/1999 | Kinebuchi | ........... G06Q 20/202 434/428 |
| 6,920,431 | B2 * | 7/2005 | Showghi | ................ G06Q 50/12 705/26.81 |

(Continued)

FOREIGN PATENT DOCUMENTS

| | | | | |
|---|---|---|---|---|
| WO | WO-2014144760 | A1 * | 9/2014 | ........... G01C 21/206 |
| WO | WO-2015112881 | A1 * | 7/2015 | ............. G06Q 10/10 |

OTHER PUBLICATIONS buyyourfriendadrink.com Acquied By Livingsocial. vol. 28. Boston: Worldwide Videotex, 2009. Print. (Year: 2009).*

(Continued)

*Primary Examiner* — Ashford S Hayles
(74) *Attorney, Agent, or Firm* — Goldstein Law Offices, P.C.

(57) ABSTRACT

A remote beverage ordering system for facilitating remote ordering of a beverage item from a participating food or beverage venue, by a customer not present within the participating venue acting as a remote buyer, with another customer present within the participating venue being a recipient of the beverage item, comprising a plurality of customer devices and a control server operably connected via a data communication network. The remote beverage ordering system obtains location data for the recipient via the customer device and notifies the remote buyer upon the recipient entering the participating venue, further allowing the remote buyer to place a remote beverage order.

10 Claims, 11 Drawing Sheets

(51) Int. Cl.
*G06Q 20/08* (2012.01)
*G06Q 20/14* (2012.01)
*G06Q 50/12* (2012.01)

(52) U.S. Cl.
CPC ..... *G06Q 20/3274* (2013.01); *G06Q 30/0641* (2013.01); *G06Q 50/12* (2013.01); *H04W 4/029* (2018.02)

(56) References Cited

U.S. PATENT DOCUMENTS

| | | | | |
|---|---|---|---|---|
| 7,174,308 B2* | 2/2007 | Bergman | ............... | G06Q 30/06 |
| | | | | 705/27.1 |
| 7,496,527 B2 | 2/2009 | Silverstein et al. | | |
| 8,750,784 B2* | 6/2014 | Ortiz | ............... | H04N 7/173 |
| | | | | 455/3.06 |
| 8,751,319 B2* | 6/2014 | Silverstein | ............... | G06Q 30/0633 |
| | | | | 705/26.1 |
| 9,204,251 B1* | 12/2015 | Mendelson | ............... | H04W 4/025 |
| 9,204,257 B1* | 12/2015 | Mendelson | ............... | H04W 4/024 |
| 9,230,259 B1 | 1/2016 | Tamassia et al. | | |
| 9,230,292 B2* | 1/2016 | Amin | ............... | G06Q 30/0641 |
| 9,373,091 B1* | 6/2016 | Belser | ............... | G06Q 20/00 |
| 9,420,423 B1* | 8/2016 | Mendelson | ............... | G01C 21/206 |
| 9,582,827 B2 | 2/2017 | Glass et al. | | |
| 9,600,946 B1* | 3/2017 | Gerace | ............... | H04W 4/80 |
| 9,665,903 B2* | 5/2017 | Glazer | ............... | A47F 10/00 |
| 9,830,625 B2* | 11/2017 | Proietti | ............... | G06Q 30/0601 |
| 9,886,716 B2 | 2/2018 | Salvatore | | |
| 10,068,272 B1* | 9/2018 | Varma | ............... | G06Q 30/0613 |
| 2004/0093281 A1* | 5/2004 | Silverstein | ............... | G06Q 20/04 |
| | | | | 705/26.8 |
| 2007/0018952 A1* | 1/2007 | Arseneau | ............... | H04N 21/2747 |
| | | | | 345/156 |
| 2007/0038503 A1* | 2/2007 | Krajcev | ............... | G06Q 30/016 |
| | | | | 705/346 |
| 2008/0040753 A1* | 2/2008 | Anandpura | ............... | H04N 21/41415 |
| | | | | 348/E7.071 |
| 2010/0121689 A1* | 5/2010 | Wallace | ............... | G06Q 20/322 |
| | | | | 705/14.1 |
| 2011/0090123 A1* | 4/2011 | Sridhara | ............... | H04W 4/021 |
| | | | | 342/450 |
| 2011/0093302 A1* | 4/2011 | Hernandez | ............... | G06Q 50/12 |
| | | | | 705/26.1 |
| 2011/0173041 A1* | 7/2011 | Breitenbach | ............... | G06Q 30/0613 |
| | | | | 705/26.1 |
| 2011/0270662 A1* | 11/2011 | Rocco | ............... | G06Q 50/12 |
| | | | | 705/14.27 |
| 2011/0288978 A1 | 11/2011 | Abifaker | | |
| 2012/0059729 A1* | 3/2012 | Roa | ............... | G06Q 30/0601 |
| | | | | 705/26.1 |
| 2012/0101900 A1* | 4/2012 | Milatz | ............... | G06Q 50/12 |
| | | | | 705/14.69 |
| 2012/0242492 A1* | 9/2012 | Grunfeld | ............... | G08B 21/24 |
| | | | | 340/667 |
| 2012/0252418 A1* | 10/2012 | Kandekar | ............... | H04W 4/21 |
| | | | | 455/414.1 |
| 2013/0073371 A1 | 3/2013 | Bosworth et al. | | |
| 2013/0096715 A1* | 4/2013 | Chung | ............... | G06Q 20/387 |
| | | | | 700/233 |
| 2013/0137464 A1* | 5/2013 | Kramer | ............... | H04W 4/021 |
| | | | | 455/456.3 |
| 2013/0185102 A1* | 7/2013 | Grossi | ............... | G06Q 30/06 |
| | | | | 705/5 |
| 2013/0197981 A1* | 8/2013 | Vendetti | ............... | H04W 4/33 |
| | | | | 705/14.5 |
| 2013/0268899 A1* | 10/2013 | Valentino | ............... | G06Q 10/02 |
| | | | | 715/852 |
| 2014/0006123 A1 | 1/2014 | Kepecs | | |
| 2014/0046802 A1* | 2/2014 | Hosein | ............... | G01R 1/06711 |
| | | | | 705/26.61 |
| 2014/0067671 A1 | 3/2014 | DeHaven et al. | | |
| 2014/0108177 A1 | 3/2014 | Erke et al. | | |
| 2014/0114807 A1* | 4/2014 | Baker | ............... | G06Q 30/0601 |
| | | | | 705/26.41 |
| 2014/0222531 A1* | 8/2014 | Jacobs | ............... | H04W 4/029 |
| | | | | 705/14.5 |
| 2014/0274125 A1* | 9/2014 | Sendonaris | ............... | G01S 5/0226 |
| | | | | 455/456.1 |
| 2014/0274153 A1* | 9/2014 | Greco | ............... | H04W 4/33 |
| | | | | 455/456.3 |
| 2015/0057025 A1* | 2/2015 | Malik | ............... | H04W 4/023 |
| | | | | 455/456.3 |
| 2015/0089660 A1* | 3/2015 | Song | ............... | H04W 4/08 |
| | | | | 705/15 |
| 2015/0177006 A1* | 6/2015 | Schulz | ............... | H04W 4/024 |
| | | | | 701/537 |
| 2015/0201305 A1* | 7/2015 | Edge | ............... | H04W 4/021 |
| | | | | 455/456.3 |
| 2015/0241238 A1* | 8/2015 | Bass | ............... | G01C 21/3673 |
| | | | | 701/434 |
| 2015/0302347 A1* | 10/2015 | Fredette | ............... | G06Q 50/12 |
| | | | | 705/15 |
| 2015/0334676 A1* | 11/2015 | Hart | ............... | H04W 64/003 |
| | | | | 455/456.1 |
| 2015/0356501 A1* | 12/2015 | Gorjestani | ............... | G06Q 10/0833 |
| | | | | 705/333 |
| 2015/0356664 A1* | 12/2015 | Mackler | ............... | G06Q 30/0635 |
| | | | | 705/26.81 |
| 2016/0005025 A1* | 1/2016 | Zamer | ............... | G06Q 20/047 |
| | | | | 705/14.51 |
| 2016/0104253 A1* | 4/2016 | Song | ............... | G06F 21/6236 |
| | | | | 705/15 |
| 2016/0110781 A1* | 4/2016 | Bedel | ............... | H04W 4/02 |
| | | | | 705/26.1 |
| 2016/0125466 A1* | 5/2016 | Kulkarni | ............... | G06F 3/04883 |
| | | | | 705/14.58 |
| 2016/0125514 A1* | 5/2016 | Plattenburg | ............... | H04W 4/029 |
| | | | | 705/26.9 |
| 2016/0127899 A1* | 5/2016 | Jabara | ............... | H04W 4/02 |
| | | | | 455/411 |
| 2016/0300389 A1* | 10/2016 | Glenn, III | ............... | G01S 5/0252 |
| 2016/0321697 A1* | 11/2016 | Chaney | ............... | G06Q 50/01 |
| 2016/0323708 A1* | 11/2016 | Sahadi | ............... | G01S 1/02 |
| 2017/0006434 A1* | 1/2017 | Howe | ............... | G06Q 20/3224 |
| 2017/0011319 A1* | 1/2017 | Elliot | ............... | G06Q 30/06 |
| 2017/0089709 A1* | 3/2017 | Marusco | ............... | G01C 21/206 |
| 2017/0169363 A1* | 6/2017 | Salmasi | ............... | G06Q 20/386 |
| 2018/0216946 A1* | 8/2018 | Gueye | ............... | G01C 21/3617 |
| 2018/0322554 A1 | 11/2018 | Born et al. | | |

OTHER PUBLICATIONS

Lu, Yiren. "Imagine an App That Does Everything." The New York times magazine (2019): 60-14. Print. (Year: 2019).*

Andy Holloway. "A New Tab." Financial post magazine (2008) (2015): 59-. Print. (Year: 2013).*

R. Purta and A. Striegel, "Predicting Friendship Pairs from BLE Beacons Using Dining Hall Visits," 2019 28th International Conference on Computer Communication and Networks (ICCCN), 2019, pp. 1-9, doi: 10.1109/ICCCN.2019.8846963. (Year: 2019).*

E. Cay, Y. Mert, A. Bahcetepe, B. K. Akyazi and A. S. Ogrenci, "Beacons for indoor positioning," 2017 International Conference on Engineering and Technology (ICET), 2017, pp. 1-5, doi: 10.1109/ICEngTechnol.2017.8308143. (Year: 2017).*

[1]Mendez, D. M., Papapanagiotou, I., and Yang, B., "Internet of Things: Survey on Security and Privacy", <i>arXiv e-prints</i>, 2017. (Year: 2017).*

* cited by examiner

REMOTE BEVERAGE PURCHASING SYSTEM

CROSS-REFERENCE TO RELATED APPLICATIONS

This application is a nonprovisional utility application of provisional patent application serial number 62925932 filed in the United States Patent Office on Oct. 25, 2019, claims priority therefrom, and is expressly incorporated herein by reference in its entirety.

TECHNICAL FIELD

The present disclosure relates generally to a system for ordering food and beverage items. More particularly, the present disclosure relates to a system which allows beverage items to be purchased remotely from a food or beverage venue for a recipient physically present at the venue.

BACKGROUND

Purchasing drinks for friends at a bar or restaurant is a classic social activity. Normally, a person who buys a drink must be present at the bar along with the recipient of the drink. A person who is absent from a gathering of friends would therefore be unable to purchase a round of drinks for those in attendance.

Various systems can be found within the prior art, which allow customers to remotely purchase goods from a vendor, while also specifying a recipient who is authorized to take possession of the purchased goods. However, such systems are unsuitable for the spontaneous nature of social drink purchasing, as these systems lack the means of informing potential buyers whether potential recipients are physically present at a suitable bar or restaurant.

A need exists for a system which tracks the location of customers, notifies potential buyers when each customer enters a beverage venue, and allows buyers to remotely purchase beverage items for the customer through integration with the point of sale system of the venue.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which allows a remote buyer not physically present within a food or beverage venue to remotely purchase beverage items for a recipient within the food or beverage venue. Accordingly, the present disclosure provides a remote beverage ordering system comprising a plurality of customer devices and a control server which are operably connected via a data communication network. Each of the customer devices is adapted to obtain location data to determine whether the customer is present within the venue. The customer device further allows the customer to access the remote beverage ordering system and place a remote beverage order as the remote buyer, or to accept the remote beverage order as the recipient. The control server is operably connected to a point of sale system of the venue, and is adapted to transmit the remote beverage order to the point of sale system for processing.

It is another aspect of an example embodiment in the present disclosure to provide a system which notifies customers when their friends are present within a food or beverage venue. Accordingly, the present disclosure provides a remote beverage ordering system which allows each customer to be associated with one or more other customers referred to as linked users. Each customer is presented with an eligible customer alert via the customer device when one of the linked users of the customer is determined via the location data to be physically present within the food or beverage venue and are thus eligible to be the recipient of a remote beverage order.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
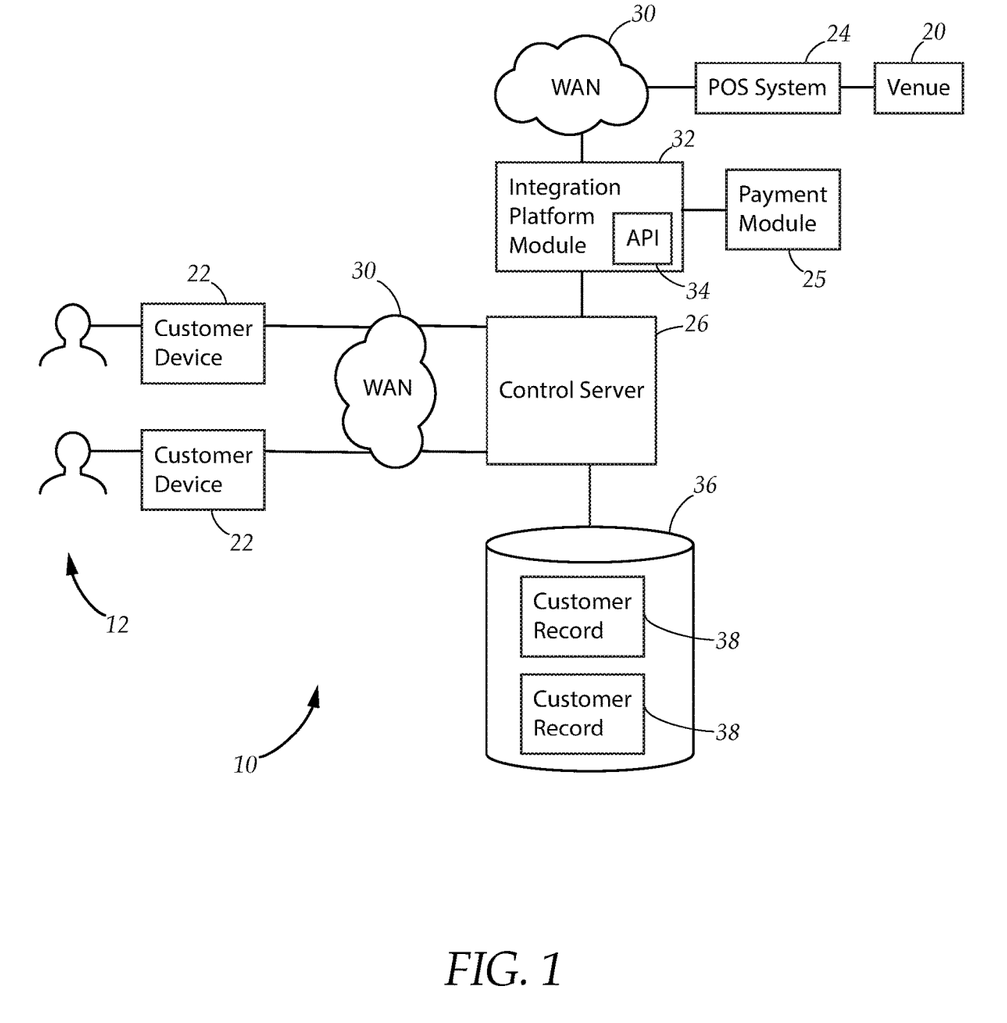
FIG. 1 is block diagram depicting a remote beverage ordering system, in accordance with an embodiment in the present disclosure.
Figure 2:
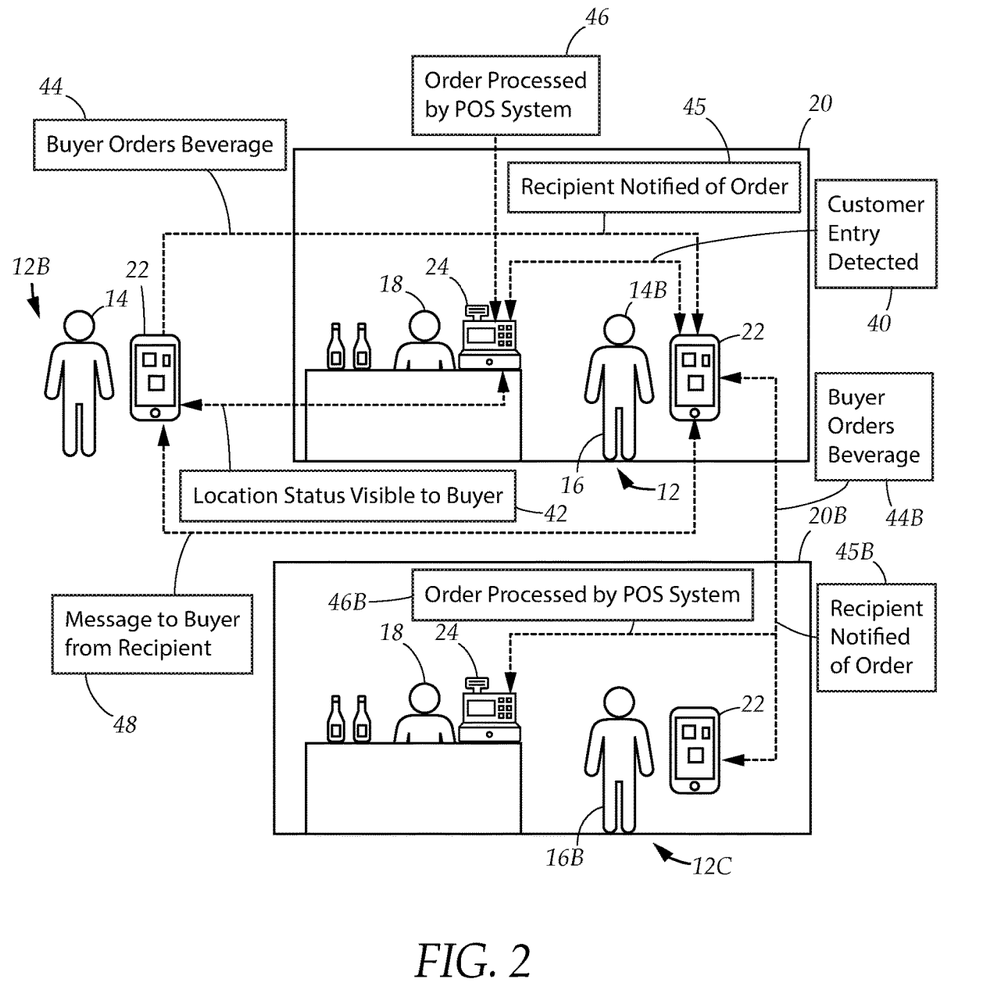
FIG. 2 is a block diagram depicting a plurality of customers interacting with the remote beverage ordering system, showing a remote buyer ordering a beverage for a recipient physically present within a beverage establishment, in accordance with an embodiment in the present disclosure.

FIGS. 1 and 2 illustrate a remote beverage ordering system 10 adapted to facilitate remote ordering of beverage items from one or more participating venues 20 by one or more customers 12 not physically present at the participating venue. The participating venue 20 may be a bar, restaurant, or other food or beverage establishment that offers beverage items for sale. The remote beverage ordering system 10 comprises a control server 26 and a plurality of customer devices 22 which are operably connected via a network 30 adapted for data communication, such as the Internet. Each customer device 22 allows one of the customers 12 to access the remote beverage ordering system 10, and is further adapted to track location data. The location data is transmitted to the control server 26, thus allowing the remote beverage ordering system 10 to determine whether each customer 12 is physically present within any participating venue 20.

The participating venue 20 has a point of sale system 24 ("POS system"), and the integration platform module 32 is adapted to operably link the POS system 24 to the remote beverage ordering system 10 to facilitate processing of remote orders. The integration platform module 32 is implemented on the control server 26, and may include an integration API 34 (application program interface), which is adapted to allow data to be exchanged between the remote beverage ordering system 10 and the POS system 24 of the participating venue 20. Each customer 12 has a user account which is associated with at least one of the other customers 12, with such customers 12 referred to as linked users. The remote beverage ordering system 10 allows each customer 12 to purchase beverage items for the customer's linked users as a remote buyer 14, as well as receive beverage items purchased for the customer 12 as a recipient 16 by the customer's linked users. In certain embodiments, the remote beverage ordering system 10 may be adapted to integrate with a social media platform, allowing for the importation of social media contacts as linked users.

The remote buyer 14 is able to place a remote beverage order from any location so long as the customer device 22 of the remote buyer 14 is able to communicate with the control server 26. Payment for the remove beverage order may be processed by the remote beverage ordering system 10 through a payment module 25, which can be any e-commerce payment processing system. Alternatively, payments for remote beverage orders may be processed through the POS system 24 via the integration platform module 32.

Continuing to refer to FIGS. 1 and 2, each customer device 22 is a portable computing device such as a smartphone, tablet, smartwatch, or other similar device having wireless network capabilities, and a display 22D capable of showing a graphical user interface. The customer device 22 further has a GPS sensor which provides the location data of the customer 12 in the form of GPS coordinates, which is then compared against the location of each participating venue 20. Note that other methods and apparatus for geolocation may be employed instead of, or in addition to GPS geolocation. In certain embodiments, indoor positioning apparatus, such as short ranged RF beacons which are detectable by the customer device 22, may be placed within each participating venue 20, allowing the presence of each customer 12 within the participating venue to be determined based on proximity to the beacons positioned within.

The customer device 22 may be configured to execute a customer application 28 adapted to present the customer 12 with various options for interacting with the remote beverage ordering system 10. The control server 26 may be any computing device adapted to communicate with the customer devices 22 via the network 30, and which is configured to perform server operations through which the functions of the remote beverage ordering system 10 are implemented. The control server 26 has a computer storage device adapted to maintain a data store 36 which contains a customer record 38 for each customer 12. Each customer's customer record stores a list of the customer's linked users as well as other customer data.

Figure 3:
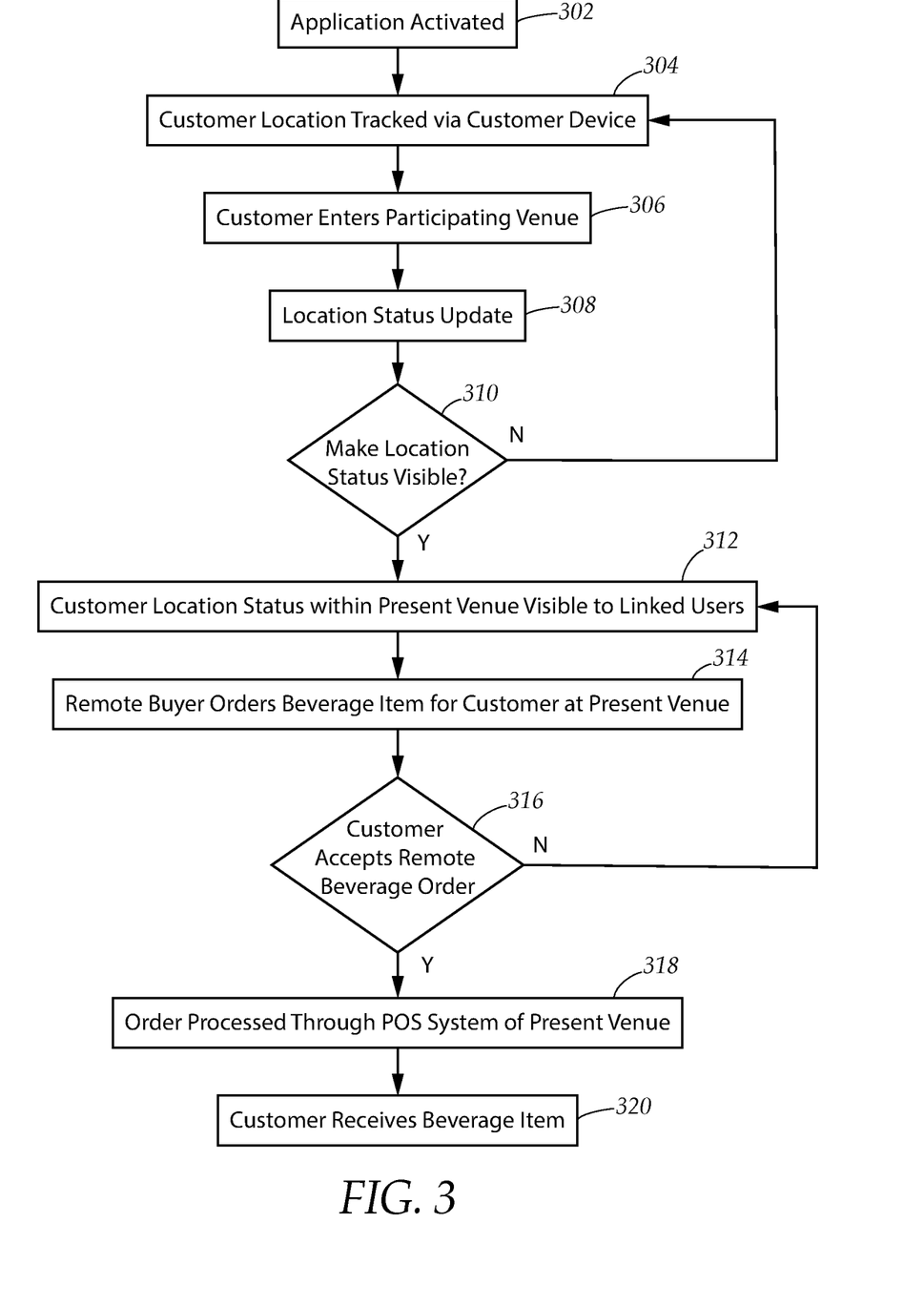
FIG. 3 is a flowchart depicting an exemplary remote beverage ordering process, in accordance with an embodiment in the present disclosure.
Figure 4:
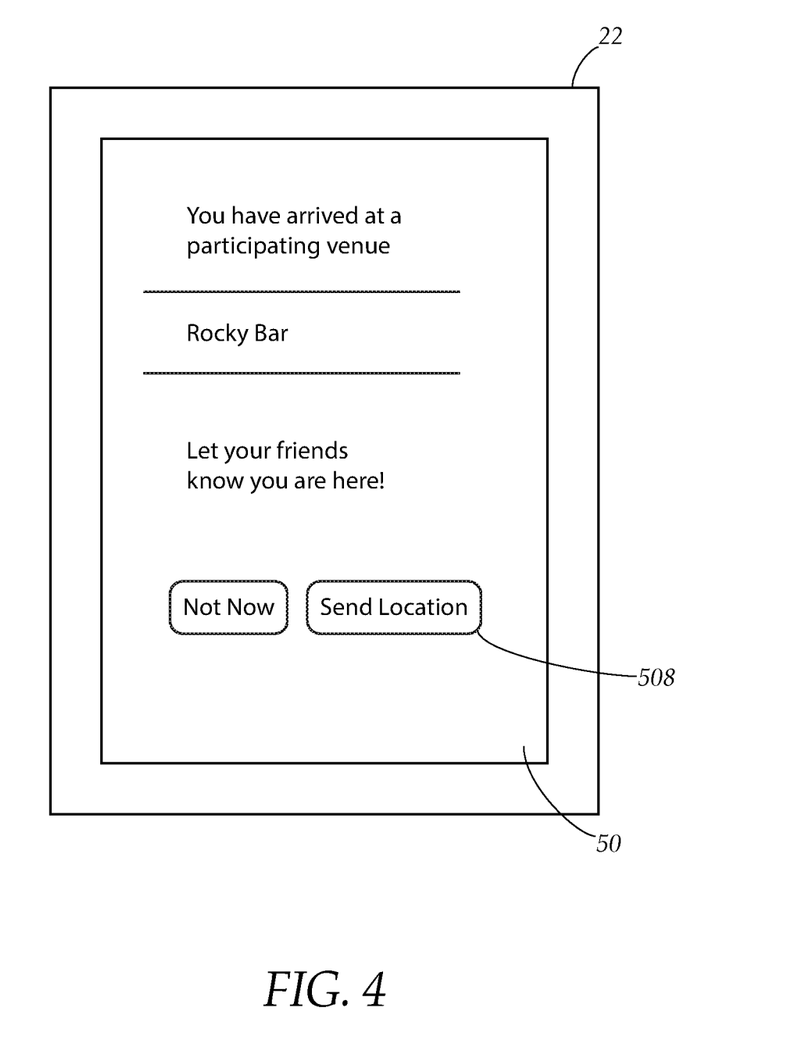
FIG. 4 is a diagrammatical depiction of the customer device displaying a location status update alert, in accordance with an embodiment in the present disclosure.

Referring to FIG. 3 while continuing to refer to FIGS. 1 and 2, an exemplary remote beverage ordering process 300 is shown. At step 302, the customer 12 activates the user application 28 using the customer device 22. The customer device then begins tracking the location data of the customer device 22 at step 304. At step 306, the customer 12 enters the participating venue 20, and the remote beverage ordering system 10 detects 42 the presence of the customer 12 within the participating venue 20. Turning to FIG. 4 while also referring to FIGS. 1, 2, and 3, in a preferred embodiment, the control server 26 will transmit a location status update alert 50 to the customer 12 via the user application 28 at step 308, which informs the customer 12 that the customer 12 has entered a participating venue 20. Next, at step 310, the customer 12 may choose whether to allow the customer's location status to be made visible 42 to the customer's linked users. In a preferred embodiment, the customer 12 may be presented with a location status visibility option 50B, which allows the customer 12 to choose whether the linked users of the customer 12 will be notified of the presence of the customer 12 within the participating venue 20. The customer 12 may instead choose to set the customer's location status to hidden, upon which the process 300 may return to step 304, where the customer device 22 continues to track the location data until the user application 28 is deactivated. In certain embodiments, the location status and the location status visibility of each customer 12 may be stored via the customer records 38 within the data store 36.

Figure 5A:
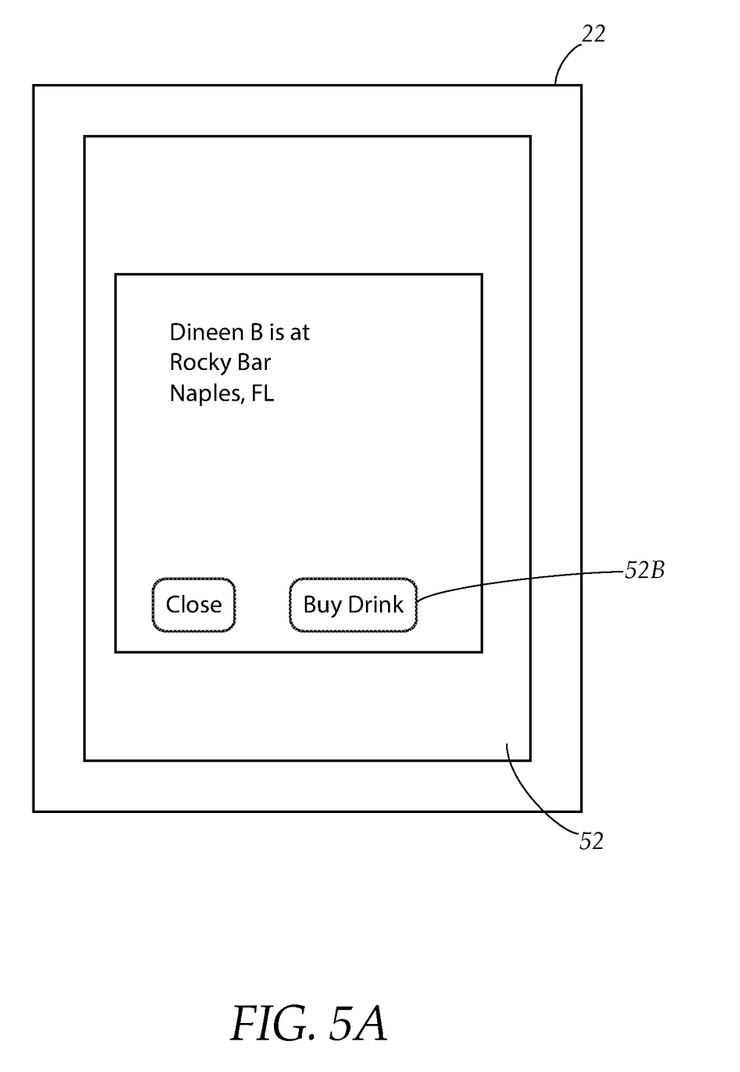
FIG. 5A is a diagrammatical depiction of the customer device displaying an eligible customer alert in accordance with an embodiment in the present disclosure.

If the customer 12 chooses to allow the customer's location status to be visible to the customer's linked users, the control server 26 may then notify the linked users of the customer 12 of customer's presence within the participating venue 20 at step 312. The customer 12 thus remains eligible to be the recipient of a remote beverage order as long as the location status of the customer 12 indicates that the customer 12 is present at the participating venue 20, and the customer's location status visibility is not hidden. Referring to FIG. 5A while continuing to refer to FIGS. 2 and 3, the customer device 22 of each linked user may display an eligible customer notification 52, indicating that the customer 12 has entered the participating venue 20 and is eligible to be the recipient of a remote beverage order. Proceeding to step 314, each of the linked users of the customer 12 may then place a remote beverage order 44, with the eligible customer 12 as the recipient 16. The eligible customer notification 52 may further provide a remote purchase option 52B allowing the linked users to immediately place a remote beverage order upon viewing the eligible customer notification 52. Any changes to the location status and the location status visibility may be tracked in real time, thereby preventing remote buyers from placing remote beverage orders if the intended recipient exits the participating venue 20.

Figure 5B:
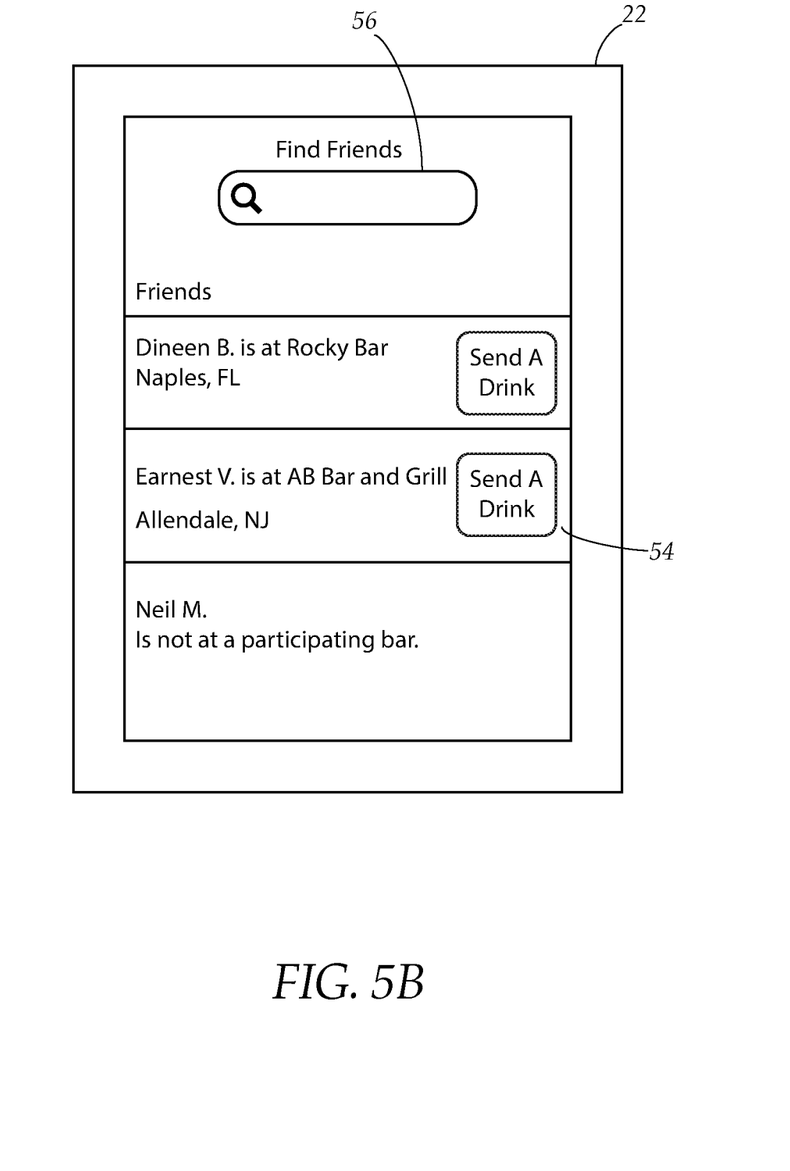
FIG. 5B is a diagrammatical depiction of a customer device displaying a linked user list showing which customers are physically present within a participating venue and are eligible to be recipients of a remote beverage order, in accordance with an embodiment in the present disclosure.
Figure 5C:
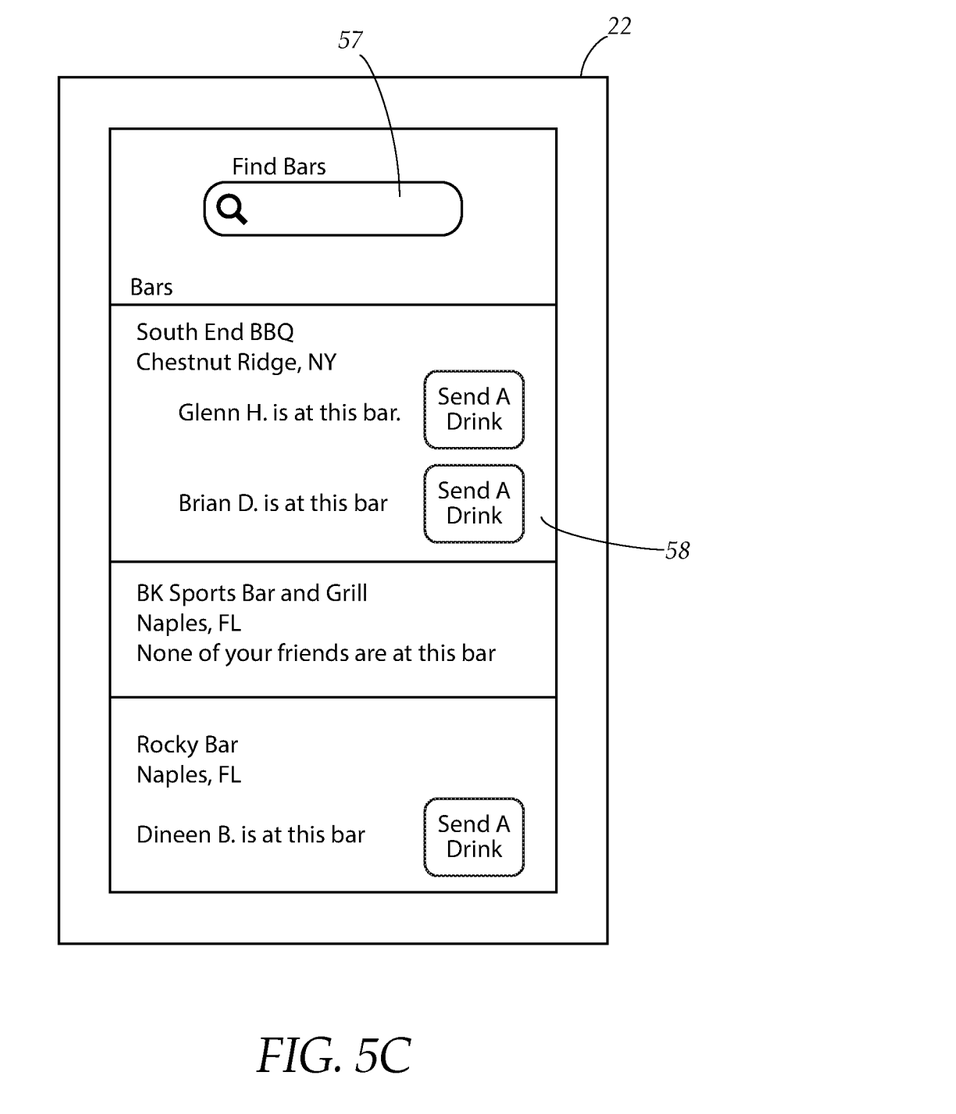
FIG. 5C is a diagrammatical depiction of a customer device displaying a participating venue list showing a list of participating venues and any customers physically present within, in accordance with an embodiment in the present disclosure.

Turning to FIGS. 5B and 5C while also referring to FIG. 2 and FIG. 5A, in addition to the eligible customer notification 52, the user application 28 is further adapted to allow each customer 12 to view the location status of each of the customer's linked users, subject to the approval of each linked user. In one embodiment, the user application 28 may present the customer 12 with a linked user list 54, which shows each of the linked users of the customer 12, and further indicates whether each linked user is eligible to be the recipient of a remote beverage order. The linked user list 54 may also identify the participating venue 20 within which each eligible linked user is physically present. The customer 12 may select any of the eligible linked users within the linked user list 54 to be the recipient of a remote beverage order. The user application 28 may also allow linked users to be searched for by name 56. The user application 28 may also present the customer 12 with a participating venue list 58, which further indicates which of the customer's linked users are physically present within each participating venue within the participating venue list 54 and are eligible to be a recipient of a remote beverage order. The user application 28 may also allow the customer 12 to search 57 for participating venues by name, geographic area, as well as other search parameters. The customer 12 may select any of the individual linked users appearing in the participating venue list 54 as the recipient of a remote beverage order. In certain embodiments, the customer 12 may also select all of the linked users within the participating venue, and purchase beverage items for the selected linked users as a group.

Figure 6:
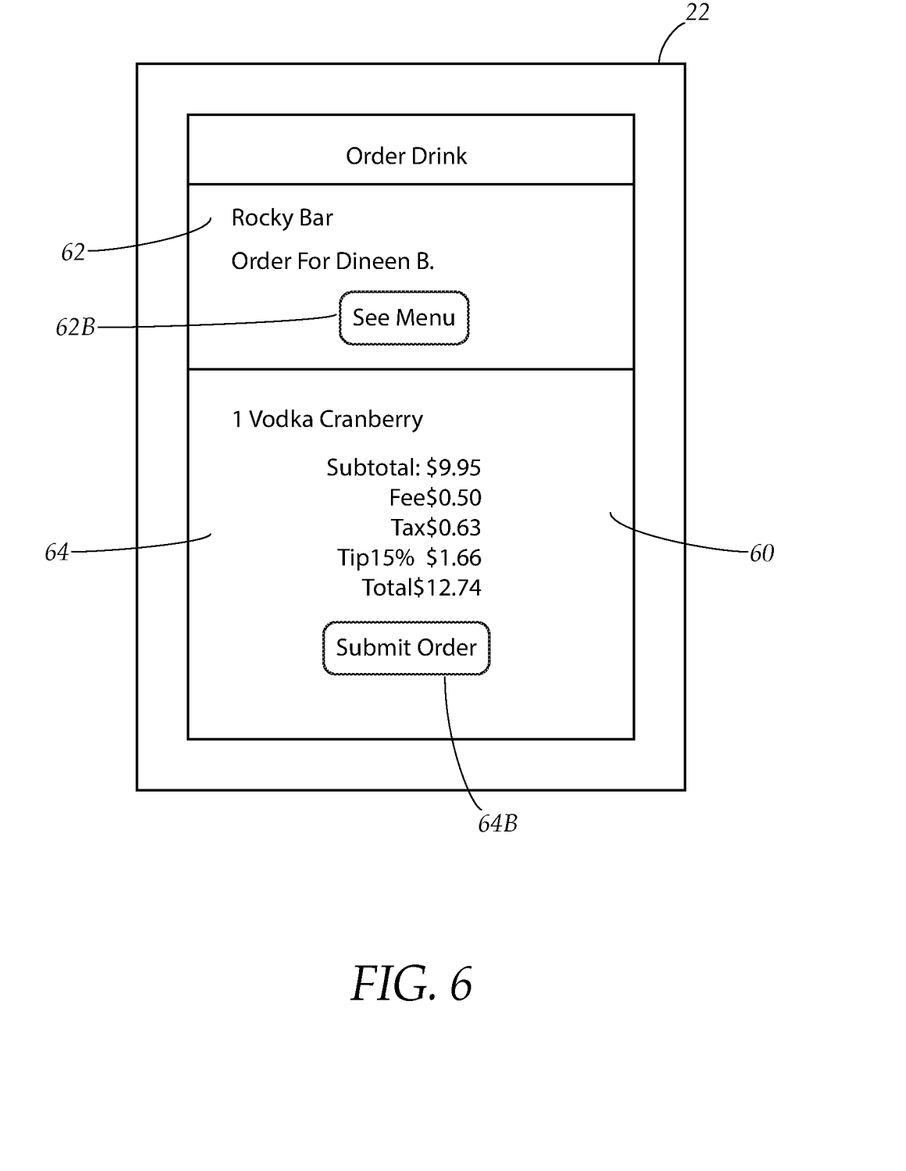
FIG. 6 is a diagrammatical depiction of a customer device displaying a remote beverage ordering interface, in accordance with an embodiment in the present disclosure.

Turning to FIG. 6 while continuing to refer to FIGS. 1, 2, and 3, the user application 28 may present one of the linked users, acting as a remote buyer 14, with a remote beverage ordering interface 60. In one embodiment, the remote beverage ordering interface may display venue information 62 such as the name of the participating venue 20 in which the recipient 16 is present, as well as menu information 62B comprising a list of the available beverage items offered by the participating venue 20. In a preferred embodiment, the integration platform module 32 allows the user application 28 to view the menu information 62B, including current pricing and availability, directly from the POS system 24. The remote buyer 14 may select and add any of the available beverage items to the remote beverage order. The remote beverage ordering interface 60 may also display an order summary 64 showing the beverage items which have been added to the remote beverage order, as well as a submit order 64B button which causes the remote beverage order to be dispatched to the POS system 24 of the participating venue 20.

Figure 7:
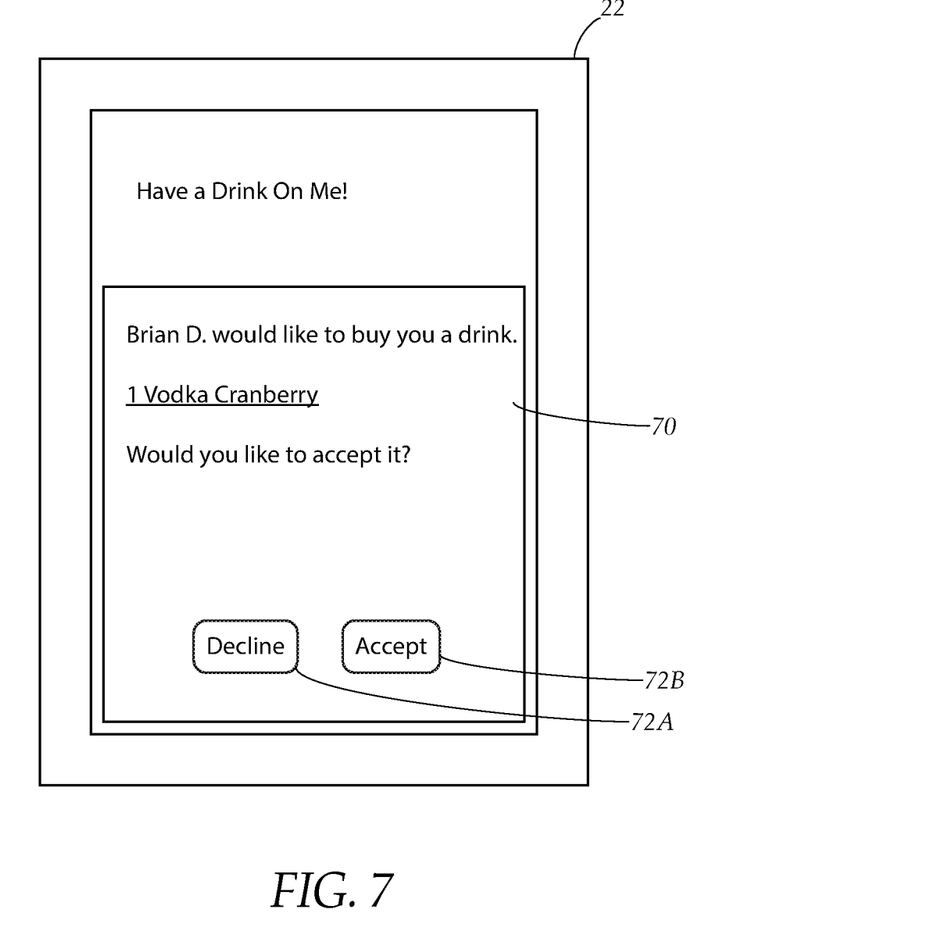
FIG. 7 is a diagrammatical depiction of a customer device displaying a beverage receipt alert notifying the recipient of the remote beverage order, in accordance with an embodiment in the present disclosure.
Figure 8A:
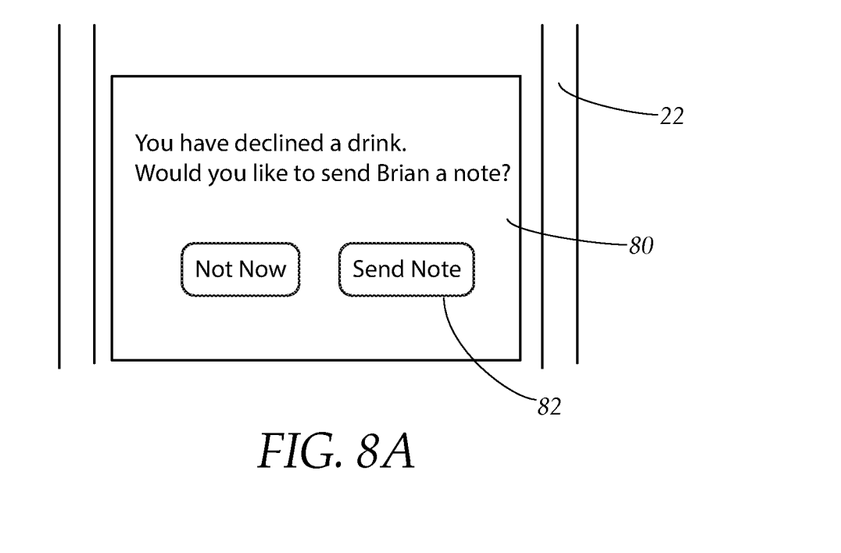
FIG. 8A is a diagrammatical depiction of a customer device displaying an option for sending a declination message upon the recipient declining the remote beverage order, in accordance with an embodiment in the present disclosure.
Figure 8B:
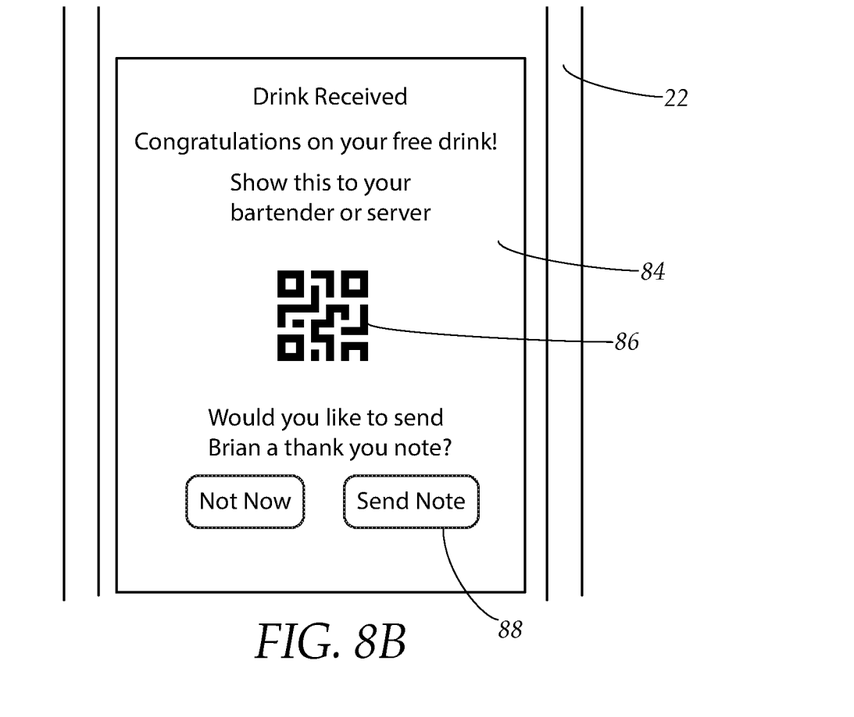
FIG. 8B is a diagrammatical depiction of a customer device displaying a redeem beverage notification, in accordance with an embodiment in the present disclosure.
Figure 9:
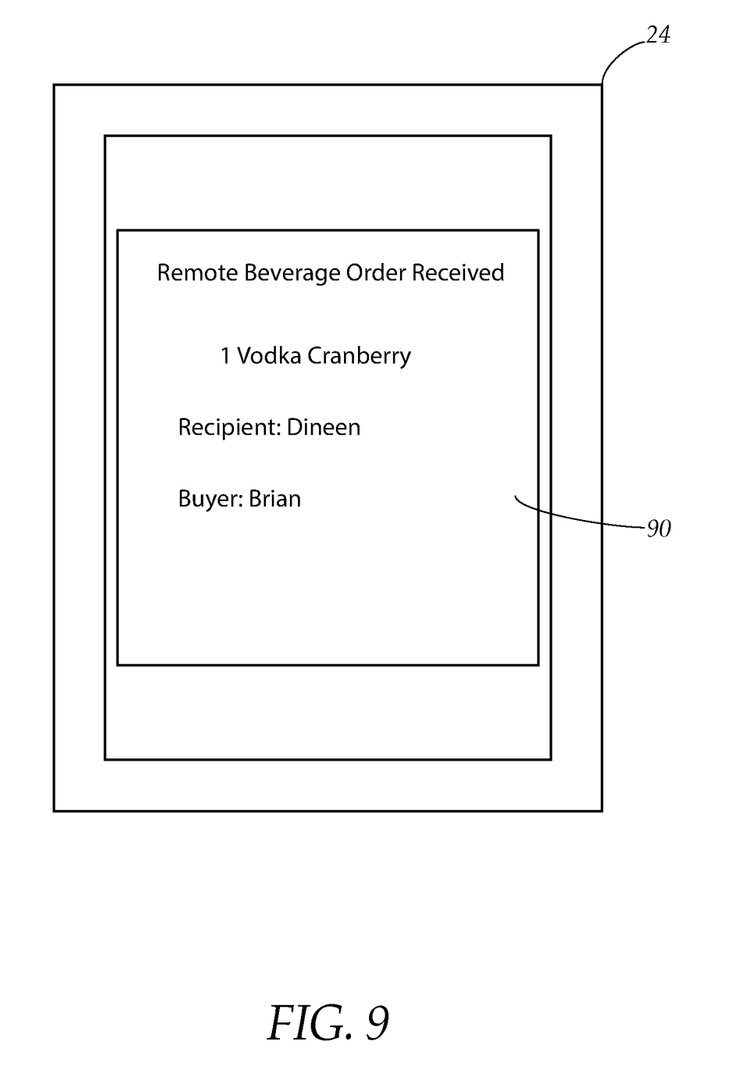
FIG. 9 is a diagrammatical depiction of a customer device displaying an order acceptance notification, in accordance with an embodiment in the present disclosure.

Referring to FIG. 7 while also referring to FIGS. 1, 2, and 3, once the remote beverage order has been submitted, the recipient 16 is notified 45 of the remote beverage order at step 316. In a preferred embodiment, the recipient 16 may receive a beverage receipt alert 70 via the recipient's customer device 22. The beverage receipt alert 70 may also identify the remote buyer 14 as well as the beverage item associated with the order. The user application 28 is adapted to present the recipient 16 with options to either accept 72A or decline 72B the remote beverage order. If the recipient 16 chooses to accept the remote beverage order, payment for the remote beverage order is processed 46 through the POS system 24 of the participating venue 20 at step 318, and a staff member 18 of the participating venue is notified via the POS system 24 to prepare the beverage item associated with the remote beverage order. Once the beverage item has been prepared by the staff member 18, the recipient 16 may redeem the beverage item at step 320. Turning to FIGS. 8 and 9 while also referring to FIG. 2, the user application 28 may present the remote buyer 14 with an order acceptance alert 90 which confirms that the recipient 16 has accepted the remote beverage order. The recipient 16 may then present the redeem beverage notification 84 to the staff member 18 in order to receive the beverage item. In certain embodiments, the redeem beverage notification 84 may also include an order code 86, which may be in the form of an alphanumeric code, a scannable optical code, or other electronic means by which the recipient 16 may be linked to the remote beverage order. Turning to FIG. 8B while also referring to FIG. 2, in one embodiment, the user application 28 may present the recipient 16 with a redeem beverage notification 84 via the recipient's customer device 22.

Returning to FIGS. 1, 2, and 3, if the recipient 16 chooses to decline the remote beverage order, the remote beverage order will be discarded by the control server 26 and no payment will be required. The process 300 may return to step 312, and the customer 12 may remain eligible to be the recipient of further remote beverage orders.

In certain embodiments, the user application 28 may allow the recipient to respond to the remote buyer via a message 48, after either accepting or declining the remote beverage order. Turning to FIGS. 8A and 8B while also referring to FIG. 2, the recipient may send an acceptance message 88 or a declination message 82 as appropriate. By sending a declination message, the recipient 16 is able to provide context to the remote buyer 14. For example, the recipient 16 may inform the remote buyer that the recipient is acting as a designated driver.

Returning to FIG. 2, the customer 12 present within the participating venue 20 may also place a remote beverage order for any of the linked users of the customer 12 who are eligible to receive a remote beverage order. For example, the customer 12 may act as a second remote buyer 14B, and place a second remote beverage order 44B for a second recipient 14B who is present at a second participating venue 20B.

In certain embodiments, the remote beverage ordering system may also allow non-beverage items, such as food items, to be purchased by the remote buyer 14 for the recipient 16.

Referring to FIGS. 1 and 2, in certain embodiments, the integration platform module 32 may be employed to enhance the remote beverage ordering system 10 by allowing customer data and venue data to be shared between the control server 26 and the POS system 24. The customer record 38 of each customer 12 may further contain an order history detailing purchases made by the customer 12 at the participating venue 20, thus allowing the remote beverage ordering system 10 to track customer habits and obtain insights into sales drivers. Additionally, the user application 28 may further allow the participating venue 20 to notify customers 12 of promotions, such as free drinks or discounts, thus encouraging customers to visit the participating venue 20 while simultaneously informing potential remote buyers of the promotions. Any applicable promotions will be automatically reflected in the remote beverage ordering interface 60, as shown in FIG. 6.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a remote beverage ordering system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A remote beverage ordering system, comprising:
one or more point of sale devices each associated with one or more venues, each venue having a venue location, each point of sale device having menu information describing a plurality of beverage items offered by the venue;
a plurality of customer devices, each customer device allows one of a plurality of users to access the remote beverage ordering system and has a geolocation sensor adapted to detect a physical location of the customer device in real-time;
a control server adapted to communicate with the point of sale device and the customer devices via a data communication network, the control server maintains a user account for each of the users, each user account is linked to at least one linked user corresponding to one of the other users, the control server updates an eligibility status for each user indicating whether the user is eligible or ineligible to receive one of the beverage items by determining if the user's physical location matches any of the venue locations; and
a customer application implemented on each of the customer devices, the customer application notifies the linked users of one of the users via an eligible customer notification when said user is eligible to receive one of the beverage items and is physically present within one of the venues, the customer application allows one of the said linked users not physically present at the venue to act as a remote buyer by placing a remote beverage order for said user as a recipient while not physically present at the venue, the remote beverage order identifying one of the beverage items, the recipient corresponding to one of the users whose eligibility status indicates the user eliaible to receive one of the beverage items, whereby the order is transmitted to the point of sale device of the venue for fulfillment by the control server.

2. The system as described in claim 1, wherein:
the customer application notifies the recipient of the remote beverage order via a beverage receipt alert, further allowing the recipient to accept or decline the remote beverage order.

3. The system as described in claim 2, wherein:
the customer application presents the remote buyer with a remote beverage ordering interface which displays the menu information of the venue in which the recipient is physically present, and the beverage item associated with the remote beverage order is selected from the displayed menu information.

4. The system as described in claim 3, wherein:
the customer application displays a redemption code which allows the recipient to redeem the remote beverage order.

5. The system as described in claim 4, wherein:
the customer application presents each user with a venue list with one or more of the venues, the venue list further identifies the linked users of said user who are present within the listed venues based on the physical location of each linked user.

6. A method for remotely ordering beverage items from one or more participating venues offering beverage items for purchase, each participating venue having a point of sale device and a venue location, comprising the steps of:
providing a customer application implemented on a plurality of customer devices, each customer device is associated with one of a plurality of users and has a geolocation sensor;
providing a control server adapted to communicate with the customer devices via a data communication network;
creating a user account for each of the users and maintaining each user account by the control server;
associating each user account with one or more linked users, each linked user corresponding to one of the other users;
determining a physical location for each customer via a geolocation sensor and comparing the physical location to the venue locations of each of the participating venues by the control server;
updating an eligibility status for each user when the physical location of the user matches the physical location of one of the participating venues to indicate that the user is eligible to be a recipient;
presenting an eligible customer notification to the linked users of the eligible user who are not present at the venue via the customer application;
presenting the linked users of the eligible user with a remote beverage ordering interface via the customer application;
placing a remote beverage order by one of the linked users via the remote beverage ordering interface with the eligible user as the recipient and selecting one of the beverage items offered by the participating venue in which the recipient is physically present;
transmitting the remote beverage order to the point of sale device of the participating venue; and
fulfilling the remote beverage order by the participating venue.

7. The method as recited in claim 6, wherein:
the step of placing a remote beverage order is followed by
the steps of presenting the recipient with a beverage receipt alert via the customer application which allows the recipient to accept or decline the remote beverage order; and accepting the remote beverage order by the recipient.

8. The method as recited in clam 7, wherein:
the step of placing a remote beverage order is preceded by
the step of retrieving menu information by the control server from the point of sale device of the participating venue in which the eligible user is physically present, the menu information describing the beverage items offered by the participating venue; and
the step of placing a remote beverage order further comprises presenting the menu information to the linked user.

9. The method as recited in claim 8, wherein:
the step of accepting the remote beverage order by the recipient further comprises generating a redemption code and displaying the redemption code using the customer device of the recipient; and
the step of transmitting the remote beverage order is followed by the step of presenting the redemption code to the participating venue by the recipient to redeem the remote beverage order, and retrieving the remote beverage order via the point of sale device.

10. The method as recited in claim 9, wherein:
the step of transmitting the remote beverage order further comprises billing the remote buyer and processing payment for the remote beverage order using a payment processing module.

\* \* \* \* \*